P. B. VREDENBURG.
BRICK KILN.
APPLICATION FILED OCT. 4, 1911.
1,067,083.
Patented July 8, 1913.
3 SHEETS—SHEET 1.
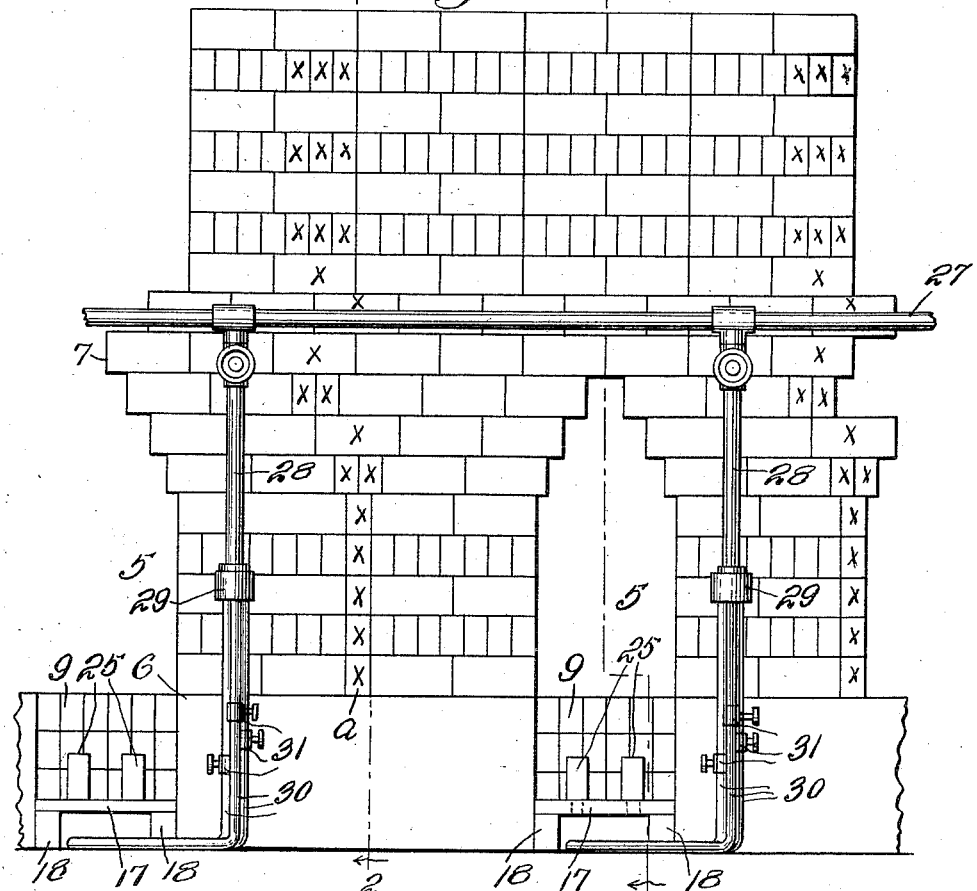
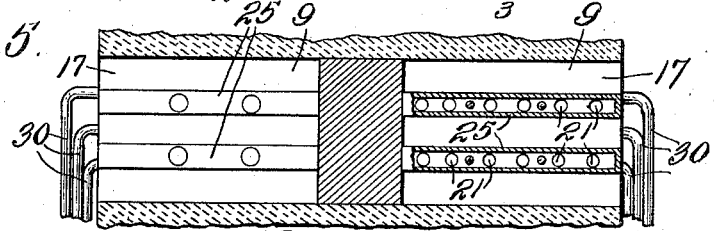
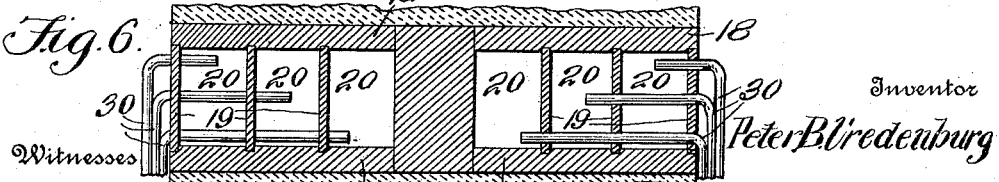

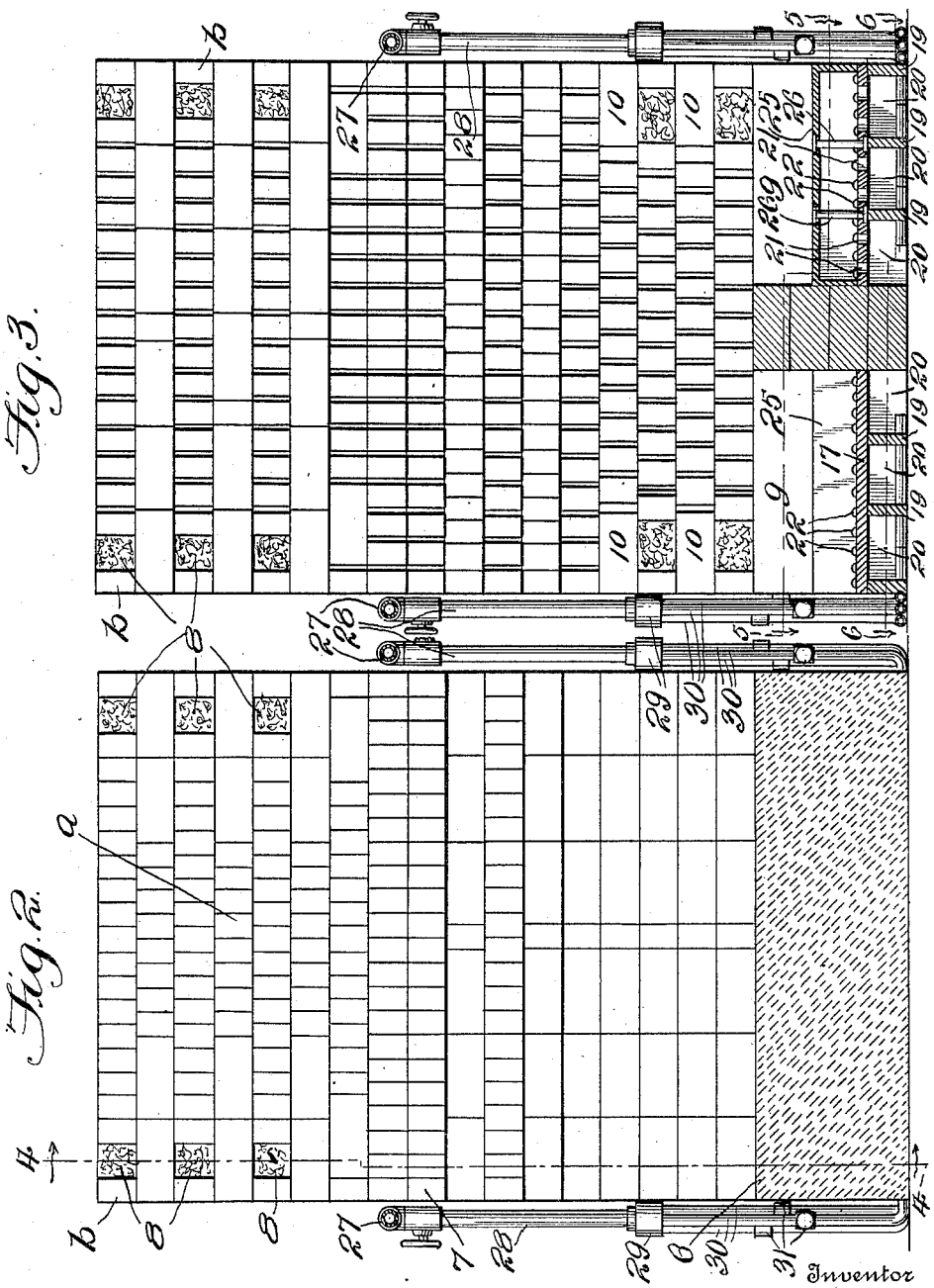

P. B. VREDENBURG.
BRICK KILN.
APPLICATION FILED OCT. 4, 1911.
1,067,083.
Patented July 8, 1913.
3 SHEETS—SHEET 3.
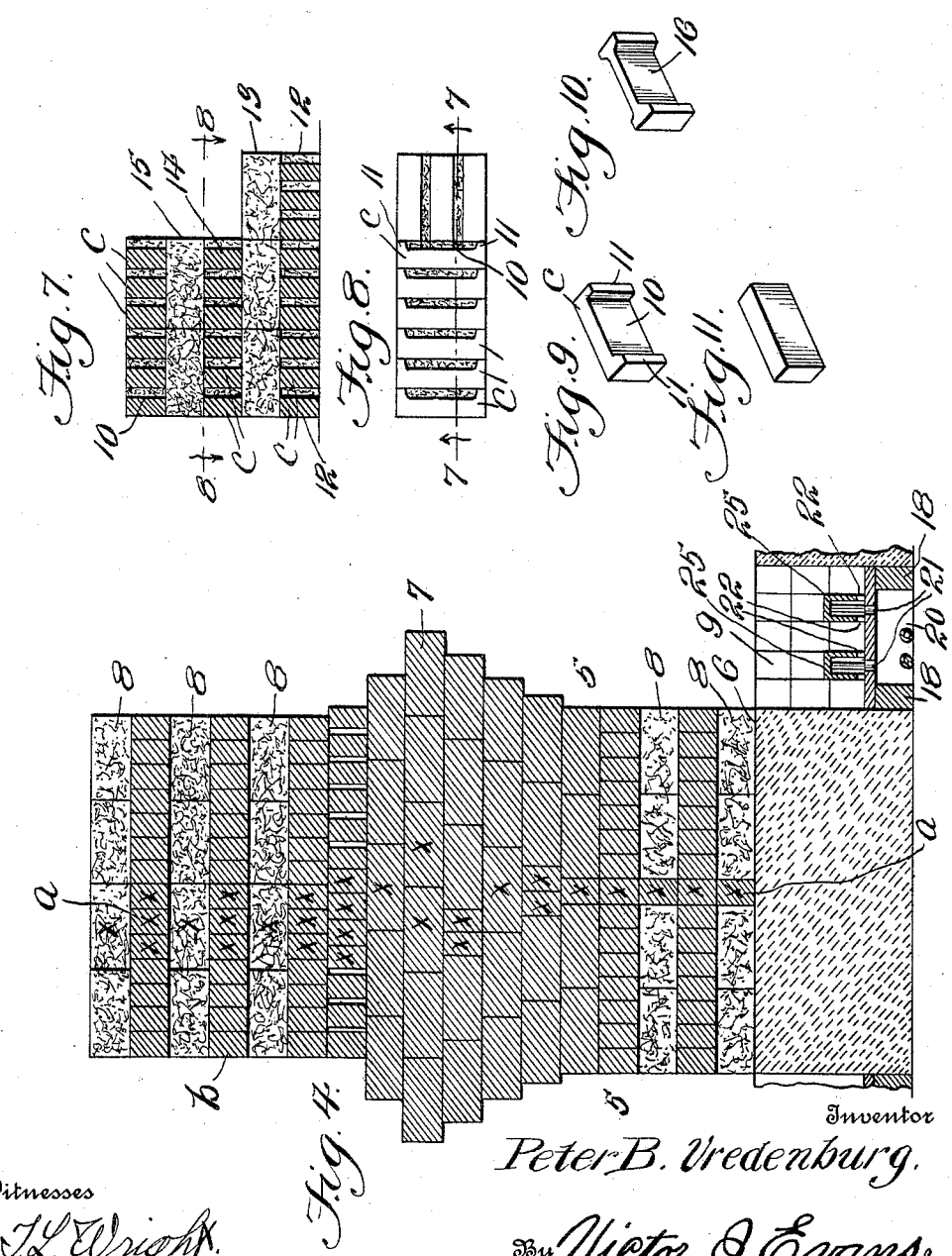

UNITED STATES PATENT OFFICE.

PETER B. VREDENBURG, OF MECHANICSVILLE, NEW YORK.

BRICK-KILN.

1,067,083.   Specification of Letters Patent.   Patented July 8, 1913.

Application filed October 4, 1911. Serial No. 652,860.

*To all whom it may concern:*

Be it known that I, PETER B. VREDENBURG, a citizen of the United States, residing at Mechanicsville, in the county of Saratoga and State of New York, have invented new and useful Improvements in Brick-Kilns, of which the following is a specification.

The general objects of the invention are to adapt a common brick kiln to be used as a continuous kiln; to regulate the fire in each compartment of the kiln, whereby, to insure the uniform burning of the bricks; to facilitate the operation of drawing and handling the fires; and to reduce the production of pale bricks.

Other objects will appear and be better understood from the following description taken in connection with the accompanying drawings, in which, Figure 1 is a fragment of one wall of a kiln constructed in accordance with my invention. Fig. 2 is a vertical section on the line 2—2 of Fig. 1. Fig. 3 is a vertical section taken on the line 3—3 of Fig. 1. Fig. 4 is a vertical section on the line 4—4 of Fig. 2. Fig. 5 is a detail horizontal section on the line 5—5 of Fig. 3. Fig. 6 is a view similar to Fig. 5 on the line 6—6 of Fig. 3. Fig. 7 is a detail vertical section of a modified form of outer wall. Fig. 8 is a horizontal section on the line 8—8 of Fig. 7. Fig. 9 is a detail perspective of the form of block employed in the wall shown in Figs. 7 and 8. Fig. 10 is a perspective of a modified form of block. Fig. 11 is a perspective of an ordinary form of pale brick employed in connection with the walls formed of the blocks shown in Figs. 9 and 10.

Heretofore in the construction of brick kilns it has been customary to arrange the bricks in spaced relation in the division walls between the several arches of the kiln with the result that when the temperature in one arch is raised above that in an adjacent arch, the arch having the higher temperature will invariably draw a portion of the heat from the arch having the lower temperature, whereby, the bricks in the last-named arch will be imperfectly burned. This defect in the construction of kilns has led me to experiment with a wall formed as nearly air-tight as possible by arranging the bricks in the several courses thereof in close contact. The result of these experiments has proved conclusively to me that when two adjacent arches are at different temperatures the one having the higher temperature will not draw from the other and moreover a kiln of several arches having the division walls constructed as above stated, may be employed as a continuous kiln.

In Figs. 1 and 2 *a* indicates a division wall between the arches 5. The various courses in this wall are indicated by *x* and extend from one side of the kiln to the other. The bricks of the various courses may be arranged in any preferred manner such as that shown in Figs. 1 and 2, wherein it will be seen that the bricks in each course from the lower bench 6 to a point adjacent to the upper bench 7 in Fig. 4 are laid on their sides with the ends thereof in close contact. From this point to the top of the arch, the bricks in the various courses may be arranged in any preferred manner such as that shown, however, care must be taken to place the abutting ends of the bricks in close contact.

In constructing brick kilns it is customary after the arches thereof are completed, to incase the kiln in a chamber which is formed by building walls of clay around the kiln. This is done to retain the heat as much as possible but practice has demonstrated that insufficient heat is retained to completely bake all the bricks in an arch, with the result that several of the outer layers of brick, owing to the insufficient burning or baking thereof, are known as pale brick and are softer than the bricks arranged in the courses exposed to the full effect of the heat. Various attempts have been made to overcome the production of pale brick, but so far as known, no economical scheme exists, whereby, to burn the outer courses of brick synchronously with the bricks around the central portion of the arch. This defect in the structure of brick kilns has led me to experiment with a fuel filled wall, that is to say, a wall provided with pockets to receive fuel such as fine coal, which, when ignited, will burn the bricks surrounding the pockets.

Referring now to Figs. 2 to 4 inclusive *b* indicates a brick wall formed with the pockets 8 which open into the fire chamber 9. The pockets 8 may be formed in any preferred manner such as by arranging one brick of an upper course over two of the succeeding lower course, the said two bricks of the lower course being spaced apart as far as possible as shown in Fig. 3. The pockets 8 flank the four faces of the kiln and the outermost bricks in each side wall form the outer sides of the pockets. Any desired number of pockets may be formed in each wall of the kiln and since the bricks designated by 10 which form the tops and bottoms of each pocket, are spaced a trifle apart the fuel which also fills these spaces will, when ignited, act in conjunction with the ignited fuel in the pocket to burn the surrounding bricks. By preference the fuel is inserted into each pocket after the bottom and sides thereof have been formed so that when the bottom and side walls of the succeeding pocket are formed and the said succeeding pocket filled with fuel, the fuel will pass through the spaces in the bottom of the pocket and mix with the fuel in the pocket immediately therebelow. In this connection I do not wish it to be understood that I intend to dispense with the employment of the usual clay casing, since the latter may be employed to good advantage with a wall constructed as just described.

In the modified form of wall shown in Figs. 7 and 8, I employ a specific form of block designated by c. This block as shown in detail in Fig. 9, is formed in one face with a channel 10 and provided with flanges 11 which form the side walls of the channel 10. With this construction I arrange the lower course of bricks designated by 12 in Fig. 10, so that the channels thereof will be vertical and the flanges 11 on one block will bear on the opposite ends of the channeled face of an adjacent block. The blocks in the succeeding course designated by 13, are arranged transversely of the blocks 12 but with the channels thereof extending vertical. The blocks in the succeeding course 14 extend parallel with the blocks in the alternate course 12, while the blocks in the course 15 are parallel with the blocks in the alternate course 13. This arrangement is carried out for the entire height of the wall. In connection with this construction it may be stated that the bricks to be burned and forming the outer face of the kiln may be arranged in the ordinary manner, that is to say, the construction shown in Figs. 2, 3 and 4 may be dispensed with or, if desired, the structure illustrated in the last stated figures may be used in combination with the structure shown in Figs. 7 and 8.

In Fig. 10, 16 indicates a modified form of block which is I-shaped in longitudinal section. In forming an outer wall with these blocks the arrangement shown in Figs. 7 and 8 is followed. By forming the blocks 16 I-shaped in longitudinal section, twice the number of pockets are provided in a wall than with the structure shown in Figs. 7 to 9 inclusive.

The blocks shown in Figs. 7 to 9 inclusive may be of any fire proofed material found suitable for the purpose.

The heating apparatus herein shown in connection with the kiln just described includes a system wherein fluid such as air or steam is forced through the fire bed, whereby, to give draft to the burning fuel in the chamber 9. In this connection I employ a grate which includes a base-plate 17 extending for the length of the fire chamber 9 and supported in spaced relation to the ground by means of beams 18 extending longitudinally of the chamber and cross-beams 19. The beams 18 and 19 coöperate to form the sides and ends of a plurality of chambers designated by 20 which underlie the base-plate 17. In the present construction three of these chambers are shown which communicate with the fire chamber through a series of openings 21 formed in the base plate 17 and through a series of lateral openings 22 formed in channeled ribs 25 arranged longitudinally of the base plate and located on the upper face thereof. The ribs 25 may be formed integral with the base-plate or connected thereto in any preferred manner such as by pins 26, as shown in Fig. 3. The cross beams 19 destroys communication between the chambers 20 except through the openings 21 in the base-plate 17.

27 indicates the conveyer pipe of a fluid pressure line connected to any suitable source of fluid pressure (not shown).

28 indicates valve controlled extensions connected with the fluid line 27 and arranged to one side of the opening of each of the fire chambers 9 as shown in Fig. 1.

29 indicates a union at the lower end of each extension which couples the extension 28 with a plurality of pipes 30 extending into the chambers 20. As shown in Fig. 6 the pipes 30 each communicates with a chamber and each pipe has a valve 31, whereby, to control the flow of fluid through that pipe. With this arrangement I am enabled to supply draft to different portions of the fire bed by regulating the valves 30 so that fluid will pass through only certain of the chambers.

By the provision of the ribs 25 and the arrangement of the openings therein, the products of combustion in the fire chamber are prevented from passing into the chambers 20 through the openings 21 in the base plate 17 and the draft fluid passes into the fire bed while moving in a horizontal direction, thus insuring an even distribution of the draft fluid to any particular section of the fire bed.

Although I have shown and described one embodiment of the invention it is to be understood that I am not to be limited to the specific arrangement and construction of parts since various changes will be made, within the scope of the appended claims without departing from the spirit or sacrificing any of the advantages of the invention.

What I claim as new is:

1. In a brick kiln, the combination with a fire chamber, of a support arranged therein and including vertical walls defining a plurality of chambers, means for admitting fluid under pressure into each of said chambers, a grate comprising a base plate arranged on the said support and provided with a plurality of rows of perforations in communication with the chambers, and means for directing the fluid laterally from each row of perforations.

2. In a brick kiln, the combination with a fire chamber, of a support arranged therein and including vertical walls defining a plurality of chambers, means for admitting fluid under pressure into each of said chambers, a grate comprising a base plate arranged on the said support and provided with a plurality of rows of perforations, and a hollow rib provided upon the upper face of said base plate in communication with each row of perforations and provided with lateral openings adjacent the upper face of said plate.

In testimony whereof I affix my signature in presence of two witnesses.

PETER B. VREDENBURG.

Witnesses:
JAMES H. HILL,
ARTHUR B. VREDENBURG.

Copies of this patent may be obtained for five cents each, by addressing the "Commissioner of Patents, Washington, D. C."